Jan. 2, 1945. W. W. GARDNER 2,366,512
PROTRACTOR MEANS FOR CUTTING OR SAWING MACHINES
Filed July 17, 1942

INVENTOR.
WALLACE W. GARDNER
BY
Ramsey, Kent, Chisholm and Lutz
ATTORNEYS

Patented Jan. 2, 1945

2,366,512

UNITED STATES PATENT OFFICE 2,366,512

PROTRACTOR MEANS FOR CUTTING OR SAWING MACHINES

Wallace W. Gardner, Lancaster, Pa., assignor to De Walt Products Corporation, Lancaster, Pa., a corporation of Pennsylvania Application July 17, 1942, Serial No. 451,358

1 Claim. (Cl. 143—6)

This invention relates to improvements in sawing or cutting machines and more particularly to improvements in means for indicating the angularity at which a part of the machine extends relative to another part.

An object of the present invention is to provide conveniently located, readily visible means for indicating the angle at which a part of a machine extends in relation to another part and for simultaneously indicating the manner in which rafters and the like can be cut for desired purposes.

Another object of the invention is to provide in combination with a machine of the foregoing character means for indicating simultaneously on each of a plurality of scales various angular relations of a cutting part of the machine.

Another object of the invention is to provide on a single member a plurality of scales which can be used selectively for determining the angle at which the ends of a rafter or similar member can be cut.

A further object of the invention is to provide means for attaching the scale-carrying member to a part of a machine with adjustment being possible for orienting such scale relative to a stop on the machine.

A still further object of the invention is to provide simplified means for attaching the scale-carrying member to the machine for adjusting the same relative to the machine.

A still further object of the invention is to provide simplified cooperating indicating means for visibly indicating to the operator the angular relation of the various parts of the machine.

Other features, objects, and advantages of the invention will become apparent by reference to the following detailed description of the same wherein Fig. 1 is a side elevation of a part of a machine showing the invention applied thereto;

Figure 1:
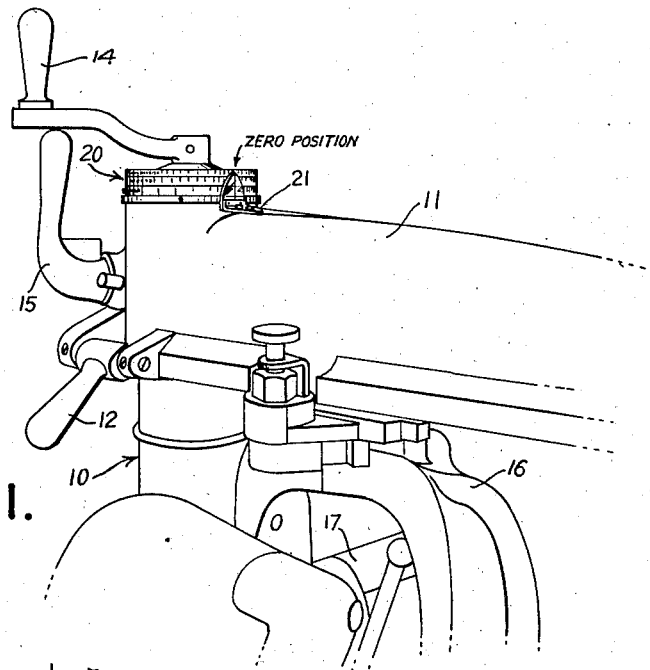
Figure 4:
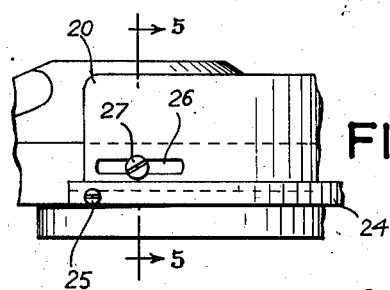
Fig. 4 is an enlarged elevation taken from the point B of Fig. 2.
Figure 2:
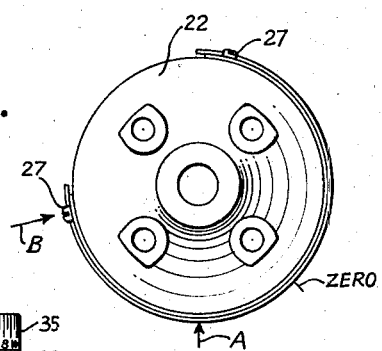
Fig. 2 is an enlarged plan view of a part of the machine shown in Fig. 1.

Referring now to the drawing, 10 indicates generally a vertical column or supporting member for a machine of more or less conventional character. This column has rotatably mounted at the top thereof a horizontally extending arm 11 which can be locked in place by a latching member 12, the cooperating parts of which are not illustrated. Elevation of the column and the arm, as a unit can be accomplished by the crank 14 and locking of the arm and column in adjusted vertical position can be controlled by the handle 15, (the cooperating parts being omitted).

Slideably supported by the arm 11 is a motor yoke 16 in which is suspended a motor 17 driving a saw or other rotatable cutting element. Inasmuch as the parts heretofore mentioned form no part of this present invention, they have not been illustrated in detail since, for the most part, they are of conventional character.

The improvement incorporated in this invention consists of a scale-carrying member 20 and a cooperating pointer 21, the scale-carrying member 20 being secured to an upper part or head 22 of the column while the pointer 21 is secured to the arm 11. Referring now to Figs. 2 to 5 inclusive, it will be seen that the scale-carrying member 20 is made of thin metal or other suitable material which is bent into partial circular form to fit partially around the head 22 which is circular in cross-section. In order that the member 20 can be adjustably secured to this head 22, use is made of a small rabbeted member 24 secured to the lower portion of the exterior of the head 22 by a plurality of screws 25. The member 20 is provided in each end with a slot 26 for the passage of a headed screw member 27 which is threaded into the head 22. The slots 26 are so disposed relative to the screws 27 and to the bottom edge of the member 20 that the bottom portion of the member 20 is retained in the space provided by the rabbeted member 24, which rabbeted member serves to maintain the member 20 in curved form against any tendency of the same to depart from such curved form. The purpose of this adjustable connection of the member 20 to the head 22 will be explained in detail later. The pointer 21 is made up of an angle piece indicated at 30, one leg of which is provided with a pair of openings 31 for the passage of screws to attach the pointer to the upper surface of the arm 11. The other leg of the member 30 has secured thereto a tapered member 32 of some suitable transparent material such as a plastic or any other material which will serve the purpose. Extending vertically on the member 32 is a thin line 34 which serves as an indicator in cooperation with the scale-carrying member 20.

Figure 3:
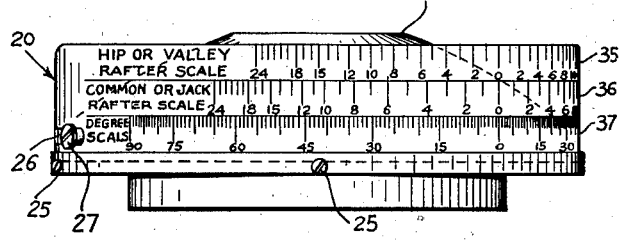
Fig. 3 is a partial front view in an enlargement of the scale mechanism shown in Fig. 1, such view being taken from point A of Fig. 2.
Figure 6:
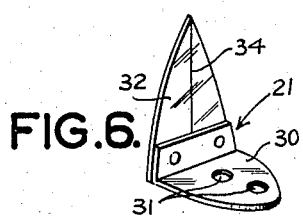
Fig. 6 is a perspective view of the pointer used in the invention.
Figure 5:
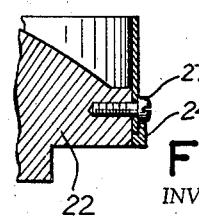
Fig. 5 is a section taken substantially on the line 5—5 of Fig. 4.

The scale-carrying member 20, as shown clearly in Fig. 3, has three scales thereon. The upper of these scales indicated at 35 is graduated for the purpose of aiding an operator in cutting rafters of the type known as hip or valley rafters. Each mark on this scale 35 indicates to an operator that such mark represents a rise of one inch per seventeen inches of run of the rafter or, in other words, if the arm 11 is moved into such position that the line 34 coincides with the graduation mark "2" on scale 35, then a rafter cut by the saw operated by motor 17 would have an end of such angularity that when properly installed in a building, the rafter would have a rise of two inches for each seventeen inches of run of the rafter.

The second scale 36 has graduations thereon for the purpose of determining the angle at which the end of a rafter can be cut, such rafters being of the type known to the art as common or jack rafters. Each graduation of the scale 36 indicates to an operator a rise of one inch per foot of run, or in other words, if the pointer 34 should be aligned with the graduation mark "2" on scale 36, an operator would know that the end of the rafter would be cut at such angularity that when installed in place, it would have a rise of two inches per foot of run. A third scale 37 is graduated in degrees so that an operator can align the thin line 34 of the pointer with any desired degree of graduation to obtain a cut of any desired angularity. It should be noted that the indication is clearly visible to an operator as to the set of the arm 11 relative to either one of the three scales simultaneously.

Inasmuch as machines of this character usually employ tables having stops thereon against which the material being processed is adapted to rest, and since such stops may become worn slightly and throw the work out of true angular disposition relative to the arm 11 and to the column 10, the present invention makes possible the orienting of the scales carried by the member 20 relative to this stop. For example, should the table stop become so worn that an initial setting of the scales is no longer accurate, a protractor could be employed in connection with the table stop and the arm adjusted until the saw carried thereby moves in a path directly and truly at right angles to the table stop. When such condition has been assured, then the scale-carrying member 20 can be adjusted by loosening the screws 27 and moving the captive member 20 until the zero position on all three scales is in alignment with the line 34 of the pointer 21. When such alignment has been attained, the set screws 27 can be tightened, locking the scale-carrying member in place. In this fashion, the three scales can be oriented simultaneously relative to any operating conditions of the arm as might be required by the positioning of a back stop on the work table.

From the foregoing, it will be seen that the present invention provides a new, simple, and efficient means whereby angular relations between parts of a machine can be simultaneously indicated for various purposes and such indicating means can be oriented as desired. The scale being positioned at the topmost part of the machine is readily visible, and since it is provided with a vertical surface located above the saw, sawdust does not readily collect on the scale and obscure it. It will be understood that the invention is not to be limited to the illustrated embodiment since it is capable of modification but is to be limited only by the scope of the following claim.

I claim:

In a woodworking machine having a supporting column, a horizontal arm supported by said column and swingable in a horizontal plane about a vertical axis established by the column, and a saw suspended from said arm and adapted to cut the work material at an angle determined by the radial position of said arm; the improvement which comprises: a vertically disposed scale strip partly encircling said column in coaxial relation thereto, the scale strip being above said arm and being provided with parallel series of graduations to indicate angles for different types of cutting operations, and an index member attached to said arm and cooperating with all of the series of graduations on the scale strip to indicate the radial position of said arm whereby the arm may be set to position the saw for making a cut at a desired angle according to any of said series of graduations, the shape of the scale strip and its position above the arm and saw keeping the graduated surface thereof substantially free from sawdust and readily visible; said scale strip being adjustably mounted for circumferential movement about said column to compensate for wear of said machine, and said column having a guideway overlying an edge of the scale strip to prevent buckling of the same.

WALLACE W. GARDNER.